United States Patent
Boivie et al.

(10) Patent No.: US 11,068,607 B2
(45) Date of Patent: *Jul. 20, 2021

(54) PROTECTING COGNITIVE CODE AND CLIENT DATA IN A PUBLIC CLOUD VIA DEPLOYMENT OF DATA AND EXECUTABLES INTO A SECURE PARTITION WITH PERSISTENT DATA

(71) Applicant: International Business Machines Corporation, Armonk, NY (US)

(72) Inventors: Richard H. Boivie, Monroe, CT (US); Jonathan D. Bradbury, Poughkeepsie, NY (US); William E. Hall, Clinton, CT (US); Guerney D. H. Hunt, Yorktown Heights, NY (US); Jentje Leenstra, Bondorf (DE); Jeb R. Linton, Manassas, VA (US); James A. O'Connor, Jr., Ulster Park, NY (US); Elaine R. Palmer, Hanover, NH (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 710 days.

This patent is subject to a terminal disclaimer.

(21) Appl. No.: 15/917,622

(22) Filed: Mar. 10, 2018

(65) Prior Publication Data
US 2019/0278918 A1 Sep. 12, 2019

(51) Int. Cl.
*H04L 9/30* (2006.01)
*G06F 9/455* (2018.01)
(Continued)

(52) U.S. Cl.
CPC ........ *G06F 21/602* (2013.01); *G06F 9/45558* (2013.01); *G06F 21/6218* (2013.01);
(Continued)

(58) Field of Classification Search
CPC .............. G06F 21/602; G06F 9/45558; G06F 21/6218; G06F 2009/45583; G06F 2009/45587; H04L 9/30; H04L 9/3213
(Continued)

(56) References Cited

U.S. PATENT DOCUMENTS 8,332,652 B2  12/2012 Boivie et al.
8,819,446 B2  8/2014 Boivie
(Continued)

OTHER PUBLICATIONS

U.S. Appl. No. 15/917,619, filed Mar. 10, 2018.

*Primary Examiner* — Dereena T Cattungal
(74) *Attorney, Agent, or Firm* — Jeffrey S. LaBaw; Jack V. Musgrove

(57) ABSTRACT

A secure cloud computing environment protects the confidentiality of application code from a customer while simultaneously protecting the confidentiality of a customer's data from intentional or inadvertent leaks by the application code. This result is accomplished without the need to trust the application code and without requiring human surveillance or intervention. A client secure virtual machine (SVM) is accessible by a client who supplies commands, operand data and application data. An appliance SVM has the application code loaded therein and includes an application program interface that accesses a memory area shared by both SVMs. All access to the appliance SVM is initially revoked by an ultravisor, except for the shared memory and an encrypted persistent storage. The appliance SVM stores the application data in the persistent storage. The ultravisor manages an SVM by maintaining exclusive control over a device tree used by the operating system of the SVM.

19 Claims, 10 Drawing Sheets

(51) Int. Cl.
   *G06F 21/60*   (2013.01)
   *G06F 21/62*   (2013.01)
   *H04L 9/32*    (2006.01)

(52) U.S. Cl.
   CPC .............. *H04L 9/30* (2013.01); *H04L 9/3213* (2013.01); *G06F 2009/45583* (2013.01); *G06F 2009/45587* (2013.01)

(58) Field of Classification Search
   USPC .......................................................... 713/193
   See application file for complete search history.

(56) References Cited

U.S. PATENT DOCUMENTS

| | | | |
|---|---|---|---|
| 8,856,544 B2 | 10/2014 | Bosch et al. | |
| 9,177,153 B1 | 11/2015 | Perrig et al. | |
| 2008/0163207 A1* | 7/2008 | Reumann | H04L 63/101 718/1 |
| 2010/0024036 A1* | 1/2010 | Morozov | G06F 21/74 726/26 |
| 2010/0146501 A1* | 6/2010 | Wyatt | G06F 21/84 718/1 |
| 2016/0171250 A1* | 6/2016 | Boivie | G06F 21/53 713/189 |
| 2019/0080086 A1* | 3/2019 | Igotti | G06F 21/554 |

\* cited by examiner

PROTECTING COGNITIVE CODE AND CLIENT DATA IN A PUBLIC CLOUD VIA DEPLOYMENT OF DATA AND EXECUTABLES INTO A SECURE PARTITION WITH PERSISTENT DATA

CROSS-REFERENCE TO RELATED APPLICATION

This application is related to U.S. patent application Ser. No. 15/917,619 entitled "PROTECTING COGNITIVE CODE AND CLIENT DATA IN A PUBLIC CLOUD VIA DEPLOYMENT OF DATA AND EXECUTABLES INTO A STATELESS SECURE PARTITION" filed concurrently herewith, which is hereby incorporated.

BACKGROUND OF THE INVENTION

Field of the Invention

The present invention generally relates to computer systems, and more particularly to a secure distributed computing system such as cloud computing wherein client data is protected from application providers and application code is protected from clients.

Description of the Related Art

Distributed computing systems are well-known in the art. One currently popular approach is known as cloud computing. In cloud computing, a variety of computing resources (e.g., processors, volatile and non-volatile memory, peripherals, network devices, etc.) are spread out over different physical locations but are operatively connected, typically using the Internet or other computer networks.

One manner in which cloud computing may be implemented involves logical partitions or virtual machines. A logical partition (commonly called an LPAR) is a subset of a computer's hardware resources which are virtualized into a separate computing system. For example, a single computer server may have hundreds of processors and terabytes of memory which are divided up into pieces and assigned to different logical partitions. A logical partition may include resources from different physical computer systems. Thus, two different logical partitions may both use a common physical memory device, but the ranges of addresses directly accessible to each partition do not overlap. The logical partitions are typically controlled by supervisory software known as a hypervisor. A virtual machine is similar to a logical partition but is distinguished in that a virtual machine has all of the components necessary to function as an effective stand-alone system.

Another related term that is in popular use today is "container". A container is a virtualized operating system. Multiple containers can run on a single operating system (OS), with each container sharing the host operating system kernel, and typically sharing the binaries and libraries as well. A container (virtualized OS) is different from a virtual machine (virtualized machine) in that each virtual machine may have its own copy of the OS that needs to be managed and patched separately, as well as its own binaries, libraries, and applications, whereas containers typically share the OS kernel. Software developers find containers advantageous because they offer increased portability, and containers are particularly useful in a cloud setting. In contrast, virtual machines built with one vendor's technology cannot run natively on other hypervisors, and they require a conversion process for each different cloud provider.

As computing systems have evolved to more complex designs such as cloud computing, the surrounding security issues have also become more difficult. Some computer security techniques now prevent anyone, other than the clients themselves, from accessing client data and applications running in a virtual machine commissioned from a cloud provider. Certain approaches couple physical security of the servers with specialized hardware, firmware and software with the aim of preventing access by anyone without proper authorization. For example, International Business Machines Corporation (IBM) has created a technology known as SecureBlue that enables data encryption to be built into a microprocessor; see, e.g., U.S. Pat. Nos. 8,332,652 and 8,819,446. With SecureBlue, data is encrypted and decrypted as it runs through a processor, and is maintained encrypted in the device memory (i.e., RAM). One of the few times data would not be scrambled is when it is actually displayed to a user. IBM has also developed a line of secure cryptographic coprocessors (4758 etc.) implemented on a high-security, tamper resistant, programmable PCI board. Intel's SGX (Software Guard Extensions) provides a set of new instructions for application developers that supports the allocation of relatively-small, private regions of memory called enclaves by user-level code that prevents unauthorized access even from processes running at higher privilege levels. IBM's System z also offers a solution known as a Secure Service Container.

SUMMARY OF THE INVENTION

The present invention in at least one embodiment is generally directed to a method of protecting client data from unauthorized disclosure by loading appliance code in an appliance which includes a secure virtual machine, revoking all access to devices from within the appliance except for a shared memory and an encrypted persistent storage device external to the appliance wherein the appliance code includes an application program interface that uses the shared memory, receiving commands, operand data and application data at the appliance via the shared memory, processing the commands, operand data and application data by the appliance code in the appliance to yield results, recording the application data in the encrypted persistent storage device, and communicating the results to a client of the appliance via the shared memory. In the preferred embodiment the client includes a second secure virtual machine, and the appliance and client operate in a system environment having a security mode imposed by an ultravisor embodied in secure microcode, the client using the ultravisor to allocate the shared memory and causing the appliance to be started with a token used to access the shared memory. The ultravisor maintains exclusive access control over the computing resources of the secure virtual machines (SVMs). The ultravisor receives a request from a client SVM to create shared memory. Preferably the request contains a token generated in the client SVM with an indication of how many times it can be used. An alternative implementation is for the ultravisor to generate the token associated with the secure memory and pass it back to the requesting SVM. In this alternative the requesting SVM still indicates how many time the token can be used. It may also indicate that the shared memory can only be accessed by an appliance SVM. In either case the ultravisor creates the shared memory and records the token and use count. The requesting SVM (in this embodiment called the client of the appliance) securely, e.g., encrypts the token with the appliance public key, and passes the token to the appliance. When the appliance starts it receives the token, decrypts it with its private key and requests access to shared memory from the ultravisor using the token. If use has been restricted by the client, and something other than an appliance attempts to use the shared memory, the request will be rejected. When the client requests shared memory that can be accessed by only one other SVM, the ultravisor prevents any entity other than the client from accessing the shared memory interface to the appliance while also preventing the client from accessing the appliance code. The ultravisor can prevent the appliance from communicating with any devices by controlling a device tree used by an operating system of the appliance. The appliance can be deployed to the partition from a different logical partition. As an additional embodiment, an appliance can be suspended by the hypervisor, in which case all of its current state will be available to the hypervisor in encrypted form protected by a key known only to the ultravisor. The hypervisor can write all of the state out to persistent storage. When the hypervisor decides to resume the appliance, the hypervisor will bring the state back into memory and when the appliance resumes the state will be decrypted and integrity checked by the ultravisor.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
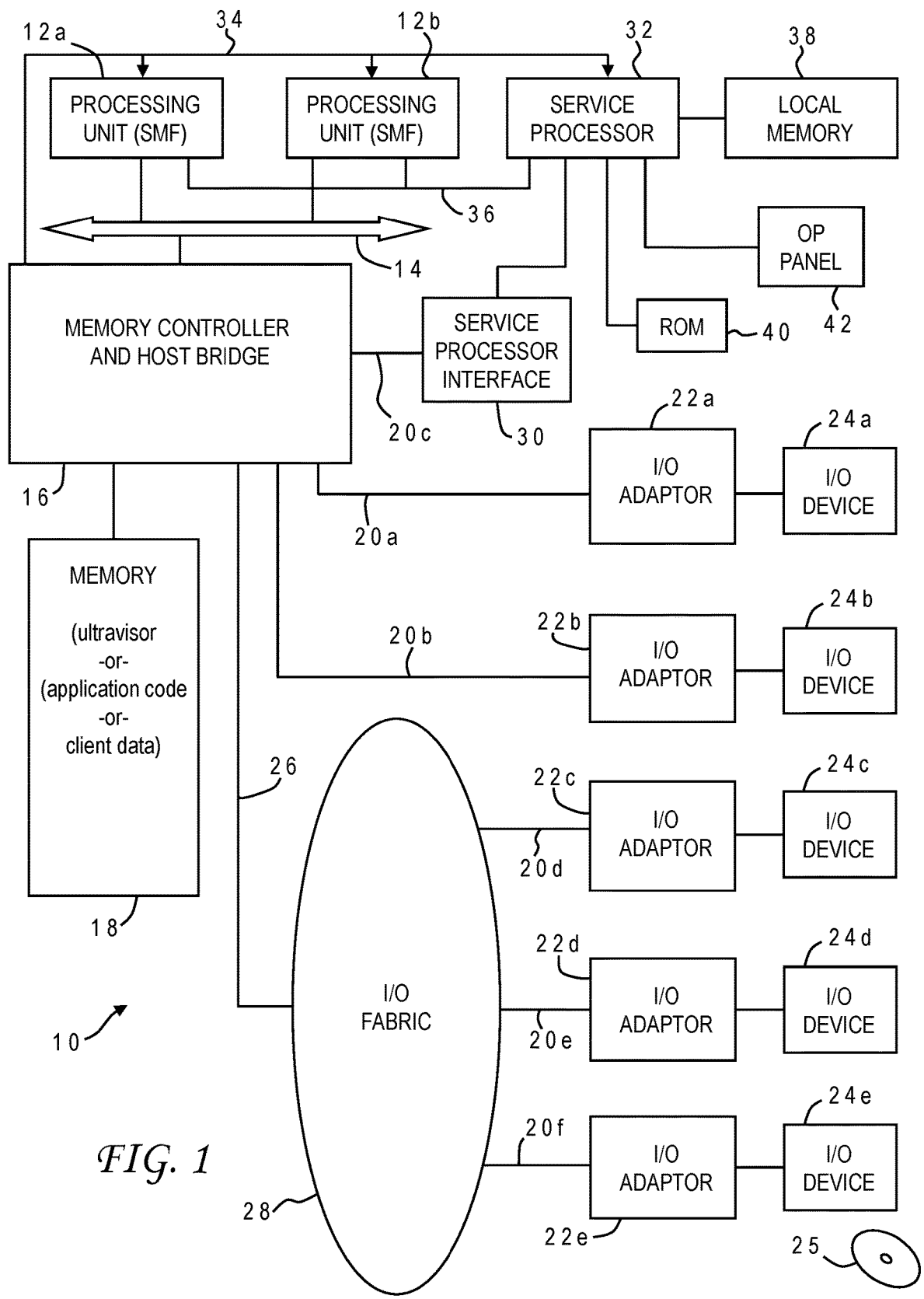
FIG. 1 is a block diagram of a computer system programmed to carry out one or more functions of a cloud computing environment in accordance with one implementation of the present invention, including operation in whole or part as a client partition or appliance partition.

Protecting computer systems from individuals and organizations with malicious intent is a critical consideration for many businesses especially those with sensitive data and intellectual property. Perpetrators have traditionally included hackers, competitors, foreign governments and common thieves. Despite the sophisticated security techniques that have been developed over the years to protect computer systems, they remain vulnerable to new attack strategies which have continued to be developed and deployed. Constant vigilance and new techniques in a continuously evolving industry are necessary. In addition, system compromise from outside an organization is not the only concern. Company employees, especially information technology (IT) personnel and administrators, normally require broad access to computer data and programs in order to do their job. There are numerous examples where an employee with nefarious intent has stolen sensitive information.

The problem is further compounded by the proliferation of cloud environments, especially public clouds, e.g., those running over the Internet. Clients utilizing third party cloud provider systems need to trust that their propriety data and programs will be secure and protected in the cloud provider's environment, yet they have little to no visibility as to who has access to their sensitive data and programs. With the cloud it is no longer sufficient to rely on a hierarchical security administration structure whereby there always remains some "master administrator" at the top of the pyramid who has the ability to change security settings and thus has virtually unfettered access to data within the system.

The prior art approaches mentioned in the Background section do not afford sufficient mechanisms to provide the needed security. None of the secure cryptoprocessors protect the code running in the coprocessor, it is all loaded in the clear. The Intel SGX secure enclave is also initially loaded in the clear, although SGX does include mechanisms that allow a secure enclave to be securely loaded with private information. SecureBlue as well as the secure service containers from System z can protect data integrity, but there is nothing that prevents the code running inside from stealing client data. Thus, while the prior art can protect the confidentiality of a so-called Secure Object, it does not prevent the code in a Secure Object from intentionally or inadvertently revealing customer data to an unauthorized party.

Homomorphic encryption, where a client's data and programs would remain completely encrypted in a cloud provider's environment, has been heralded as an eventual solution to this dilemma. However, a practical, every day implementation of computer systems that exploit homomorphic encryption has yet to be realized. New and better techniques and means are needed to better protect sensitive client data as well as proprietary application provider executables from third party access and theft especially in public cloud environments.

This problem may be further understood with reference to the example of the Watson™ cognitive systems marketed by IBM for a cloud environment. The IBM Watson™ technology (sometimes referred to as deep learning, deep thought, or deep question answering system) is a modern implementation of artificial intelligence which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. IBM makes this technology available as a service to various clients, such as a retailer. The retailer may want to provide a virtual assistant to help consumers navigate a web site in order to purchase a product. In this case, the client can provide the corpora as application data to be used by the Watson™ application code. This application data is different from the actual data operated on by the code, such as a consumer query. In this scenario, it is incumbent to protect the Watson™ application code itself (from hackers as well as disclosure to the client), but the client may also want to protect the client-provided data.

It would, therefore, be desirable to devise an improved method of providing a cloud computing environment which could protect the confidentiality of the application (e.g., "jewel") code from a customer. It would be further advantageous if the method could protect the confidentiality of a customer's data from intentional or inadvertent leaks from code that is processing the customer's data whether that code is jewel code or plain-vanilla code that does not need to be confidentiality-protected. The present invention achieves these and other objectives in its various implementations by leveraging and extending existing security techniques crafted to impede third party access to data and application environments running in a virtual machine or container. It prevents anyone from accessing the system partition where the client's data is being processed by an application, as well as preventing applications provided by an independent third party from stealing client data. Different partitions or virtual machines are used to simultaneously prevents access to client data by others and also impede the client or anyone else from accessing the application provider executables. Neither the client nor the application provider, nor the system administrator nor anyone for that matter can access the virtual machine or system partition where the proprietary code processing client data resides. This result is accomplished without the need to trust the application provider or application provider's code. While the invention is particularly useful in protecting innovative and proprietary executables with Watson™ technology in mind, it is readily usable by other application providers as well. Not needing to trust the application nor the supplier of the application code while also preventing access to the application executables is extremely useful especially since it is accomplished without requiring human surveillance or intervention.

With reference now to the figures, and in particular with reference to FIG. 1, there is depicted one embodiment 10 of a computer system in which the present invention may be implemented in part to carry out cloud computing using application code provided by one entity which acts on client data provided by a different entity. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or programs in accordance with the present invention such as an ultravisor (described further below), particular application code, or client provided data.

MC/HB 16 preferably also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information. I/O to the service processor may be direct and independent of the memory controller/host bridge.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-inself-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular one of the cloud computing applications used by the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Figure 2:
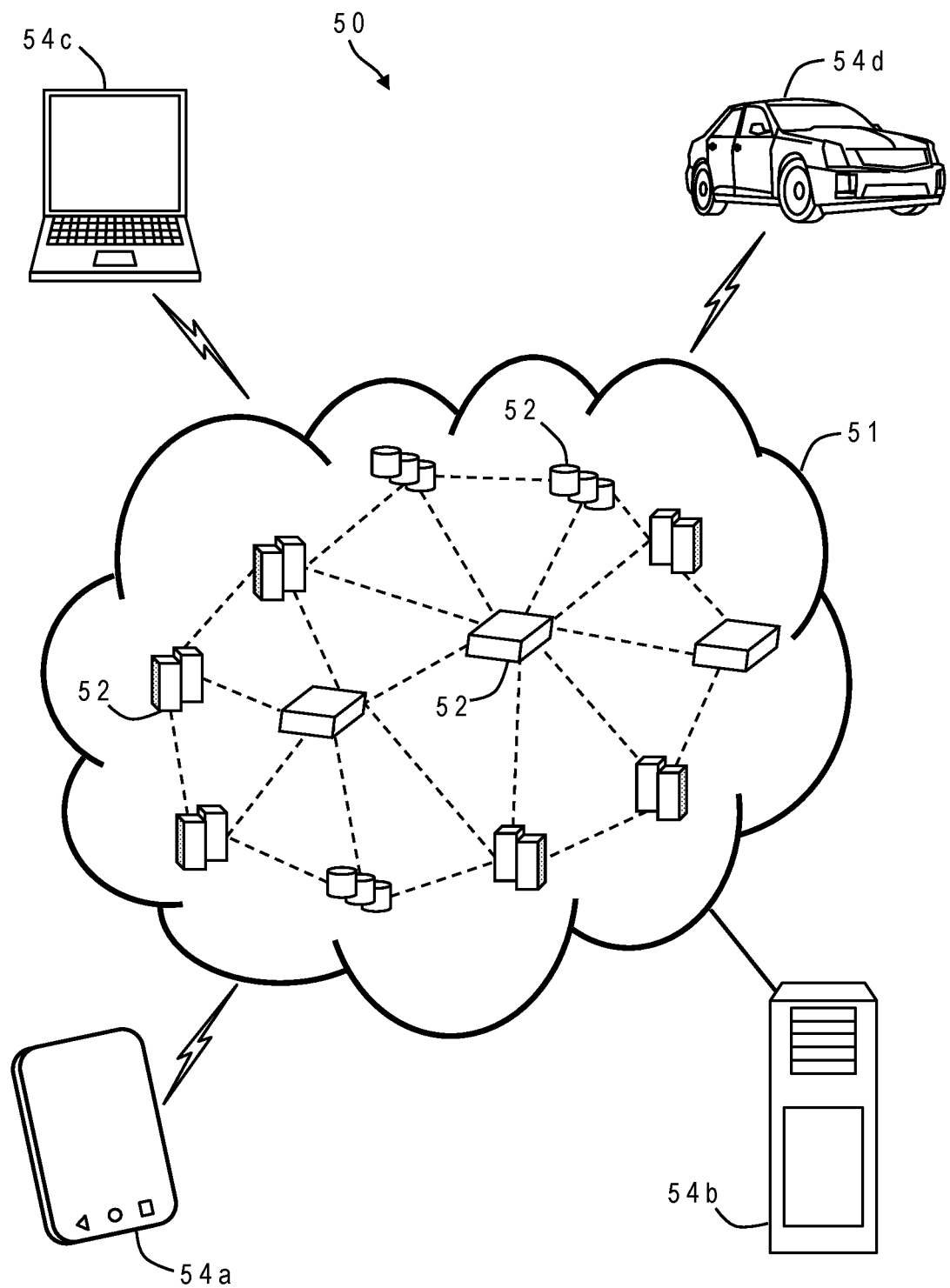
FIG. 2 is a pictorial representation of a cloud computing environment in accordance with one implementation of the present invention.

A cloud computing environment is service oriented with a focus on statelessness, low coupling, modularity, and semantic interoperability. An illustrative cloud computing environment 50 is depicted in FIG. 2. At the heart of cloud computing is an infrastructure that includes a network 51 of interconnected nodes. Network 51 may be the Internet, a local area network, a virtual private network, or any combination of the foregoing including other forms of networks. As shown, cloud computing environment 50 includes one or more cloud computing nodes 52 with which local computing devices used by cloud consumers, such as, for example, personal digital assistant (PDA) or cellular telephone 54*a*, desktop computer 54*b*, laptop computer 54*c*, and/or automobile computer system 54*d* may communicate. Nodes 52 may communicate with one another. One or more of these nodes may be a computer system having an architecture such as that shown in FIG. 1 for computer system 10. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54a-54d shown in FIG. 2 are intended to be illustrative only and that computing nodes 52 and cloud computing environment 50 can communicate with any type of computerized device over any type of network and/or network addressable connection (e.g., using a web browser).

Figure 3A:
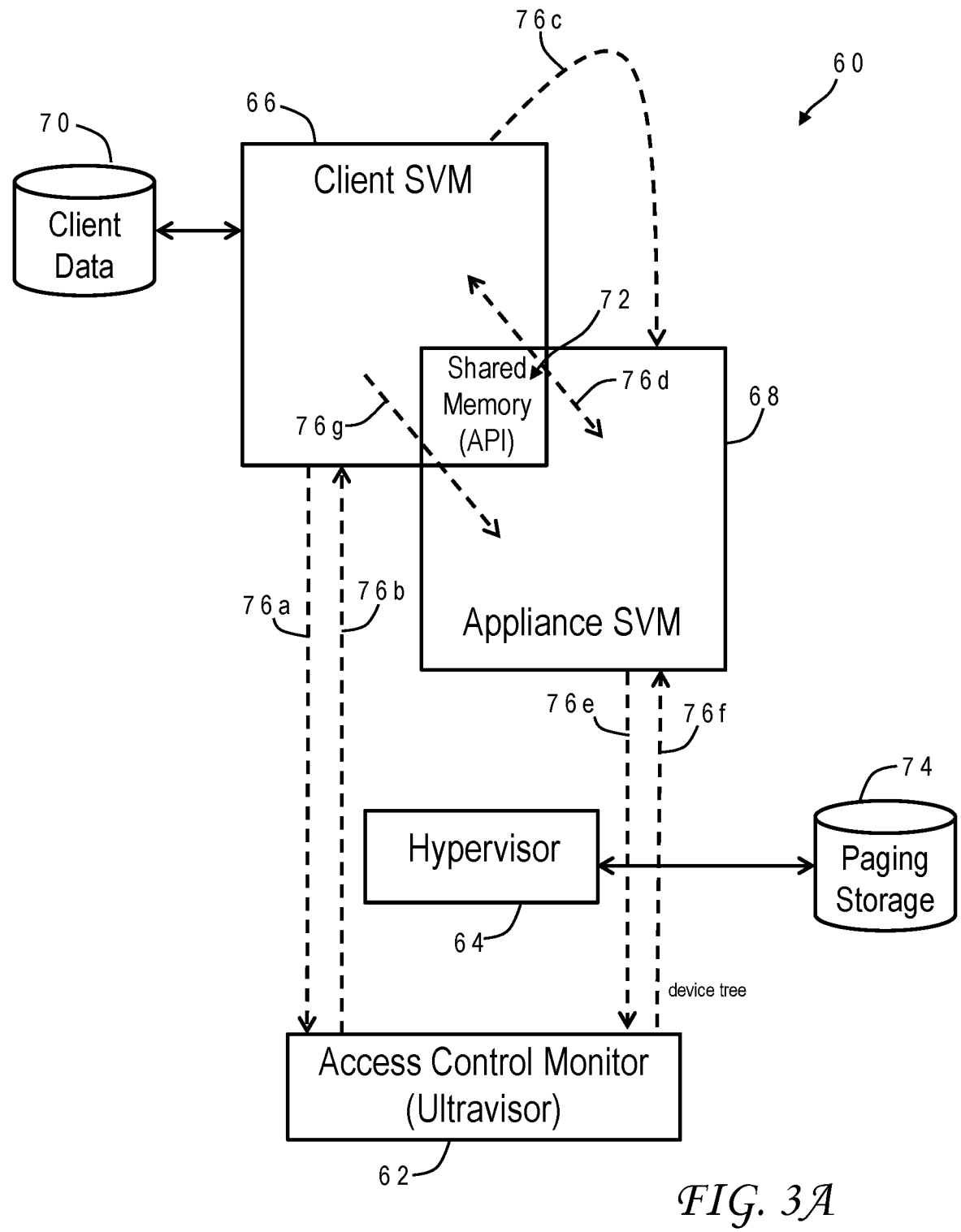
FIG. 3A is a block diagram of a computing environment which includes a client secure virtual machine (SVM) and an appliance SVM having shared memory in accordance with one implementation of the present invention wherein the appliance remains stateless.

Referring now to FIG. 3A, there is depicted one embodiment of a node 60 in a cloud computing system constructed in accordance with the present invention. Node 60 includes an access control monitor 62, one or more hypervisors 64, a client secure virtual machine (SVM) 66, and an appliance SVM 68. In this implementation, access to all of the computing resources of cloud computing node 60 are controlled by access control monitor 62, hereinafter referred to as an ultravisor. These computing resources may include additional resources not depicted in FIG. 3A.

Ultravisor 62 acts as a supervisory agent more privileged than the prior art hypervisor mechanism, i.e., the functions of hypervisor 64 are subject to the privileges granted by ultravisor 62. Ultravisor 62 is firmware, that is, secure microcode embedded in (or securely loaded into) hardware of a machine. In a cloud environment this machine is not physically accessible by either a client using client SVM 66 or an application provider using appliance SVM 68.

Host firmware is the main boot firmware stored in the processor NOR flash chip that is used to initialize the host processor and make the system boot until it achieves a runtime state after which the boot process is taken over by the operating system, for this description, by the Linux operating system. The processor is booted in a secure and trusted manner that is known to the art, so that the state of the firmware on the system can be verified. After the system is powered on host firmware initializes the processor, the memory subsystem and the Peripheral Component Interconnect (PCI). The firmware generates an initial device tree. The device tree is a binary tree structure, where all the devices are nodes, and different features of the devices available to the machine are property value pairs. The Linux kernel uses the device tree to configure different device drivers available to the system.

Ultravisor 62 controls the devices available to a virtual machine by editing the device tree used by the kernel of the operating system of the virtual machine, which defines the various devices usable by the virtual machine (in the illustrative embodiment the ultravisor is only involved in the execution of secure VMs, however in an alternative embodiment it could be involved in the start up of virtual machines). If a device (physical or virtual) does not appear in the device tree, that device is not accessible to that virtual machine under any circumstances because it is impossible to address the device. Hypervisor 64 essentially performs the prior art hypervisor functions such as logical partitioning of resources to be used by different virtual machines. The ultravisor controls the resources available to the hypervisor by editing the device tree used to boot the hypervisor. Hypervisor 64 can use a storage device 74 for holding paging information related to the memory resources assigned to various partitions.

Client SVM 66 includes a first logical partition externally accessible solely by a client using any number of existing mechanisms such as a login password via secure socket layers (SSL). No unauthorized party can access the client partition including cloud administrators. Client SVM 66 may have its own applications running, provided by the client. Client SVM 66 also receives client data 70 provided by the client. The client data may include both operand data and application data. For example, in the context of cognitive technology such as the Watson™ deep question answering system, the application data may include the corpora (training data or ground truth) to be used by the appliance in carrying out its primary functions. In this case operand data might include a user query which is to be answered by the Watson™ system.

The appliance SVM 68 is a separate SVM booted on the system. Once activated, no one whatsoever has access to the appliance partition including the application provider or system administrator, except for client SVM 66 via a shared memory 72 as explained further below. Once booted, nothing can leave the appliance partition unencrypted, except via the shared memory which is accessible by an application program interface (API) of the appliance. The SVM which creates the shared memory controls the number of SVMs that can utilize the appliance. In the preferred embodiment it is one SVM per appliance. In other words, the appliance API uses the shared memory as its interface to users of the appliance.

Shared memory 72 is enabled by a secure memory facility embedded in one or more of the processors used by client SVM 66. As is known in the art, processors use page tables to associate blocks of physical memory (i.e., RAM) with specific virtual address ranges. In the present invention page tables for secure virtual machines are controlled by ultravisor 62. Commands and data can be exchanged between the client and the appliance via the API. The API is the only means for the client to interface with and use the appliance executables and all of the appliance results are received through it.

Figure 3B:
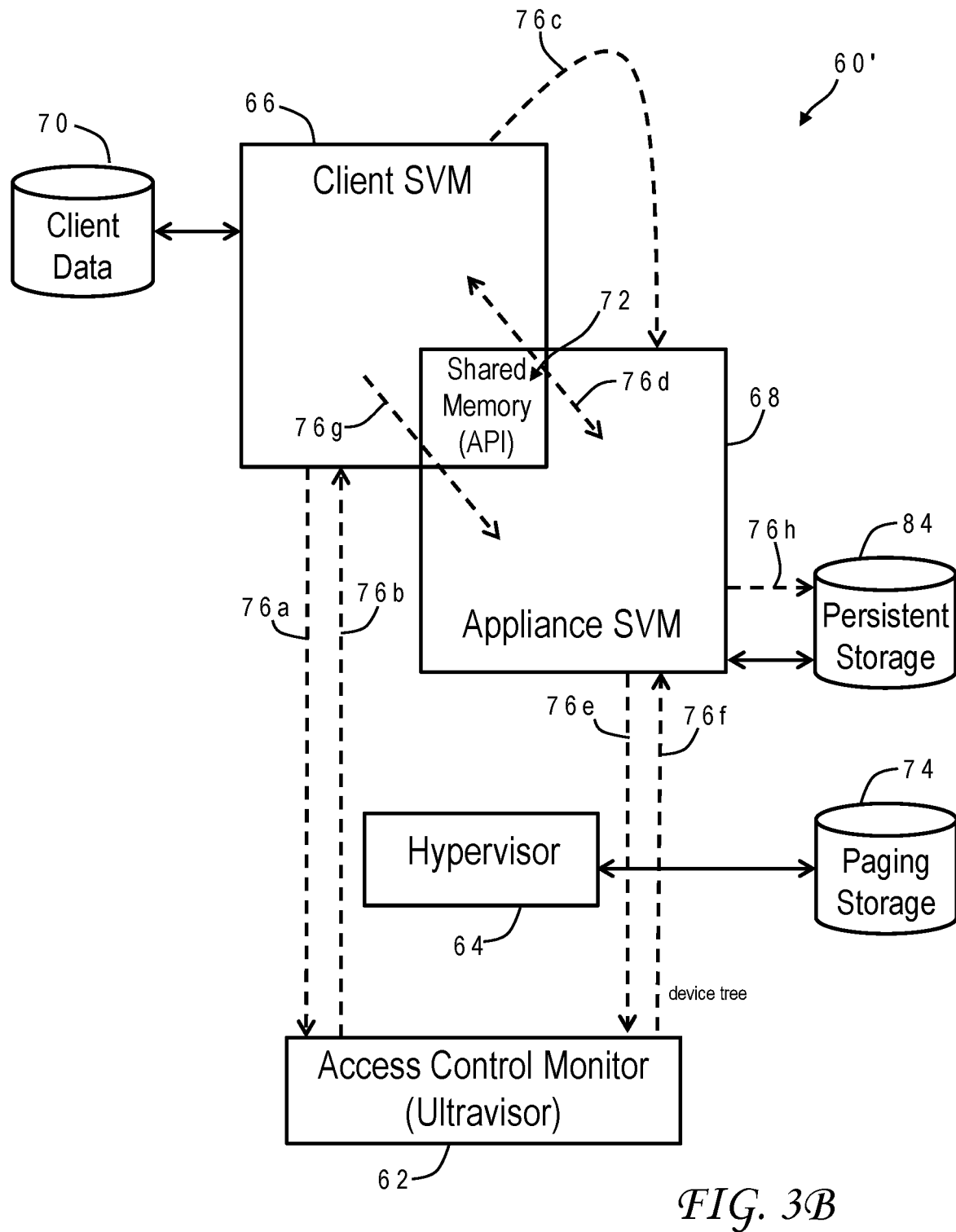
FIG. 3B is a block diagram similar to FIG. 3A for another implementation of the present invention wherein the appliance saves data to an encrypted persistent storage device.

In the foregoing description, all copies of secure appliances can have the same public private key pairs because they are stateless, i.e., they never save the working data in any persistent form. Alternatively, even though stateless, the creator of an appliance can configure each copy with a secret only known to the user of the appliance so that it will only work for authorized users. With a stateless appliance, all data the client asks the appliance to work with has to come from the API, i.e., shared memory 72. Consequently, all users of stateless appliances control their own persistent data. However, for some applications, it is inefficient to continuously reload client data into the appliance. For example, reloading massive corpora each time a request is made of a cognitive system would be impractical. In an alternative implementation an extension is used to enable a secure persistent state for an appliance as illustrated in FIG. 3B. The prior implementation exploited the ability of the ultravisor to control the device tree of a virtual machine. As further shown in FIG. 3B, this control can be used to allow secure encrypted persistent storage 84 to be available to appliance SVM 68. The appliance can save any desired data on persistent storage 84 in an essentially permanent (non-volatile) form. The data on persistent storage 84 remains secure because the key is only known to appliance SVM 68. The appliance SVM can properly use this storage by using any encrypted file system known to the art, such as dm-crypt. This capability enables the cognitive application to store data, results, and partial results on persistent storage 84 outside the SVM which may be necessary when processing large datasets supplied by the clients.

Whenever the hypervisor needs to page memory out of an SVM because of memory overcommit, the ultravisor can make the memory page available to the hypervisor in encrypted form. The hypervisor will write the page to paging store 74. When a page is brought into memory from paging store 74, the ultravisor will decrypt it and check the integrity prior to making it available to the SVM. This capability makes memory overcommit available to appliance SVMs. Encryption by the ultravisor of memory before it is paged by the hypervisor prevents anyone with access to paging store 74 from stealing information. The capability to securely use persistent storage 84 enables the cognitive application to page data, to store data, to store results and partial results on storage inside or outside the server which may be necessary especially when processing large data sets supplied by the client. This capability would certainly be useful for other applications configured as an appliance. In any case the invention would also be useful to clients that want to protect proprietary data and to other application suppliers that also want to prevent access to their application executables.

Operation of cloud computing node 60 can be described differently depending on perspective. In one implementation, operation begins with the client SVM requesting shared memory from the ultravisor with a special "ultra-call" to be shared with another SVM, as indicated as 76*a*. The ultravisor may be designed to allow multiple virtual machines, not just two, to share the memory space, and the ultra-call tells the ultravisor how many virtual machines are to be allowed to share the area. In a preferred embodiment the ultra-call will also tell the ultravisor that only a appliance can access the shared memory. The ultra-call includes a secret (token). The ultravisor then grants the request, sending confirmation to the client SVM, as indicated as 76*b*. The client SVM starts the appliance and passes the token for the shared memory, as indicated as 76*c*. The client SVM and appliance SVM then mutually authenticate each other, as indicated as 76*d*. The appliance SVM responsively requests access to the shared memory from the ultravisor, as indicated as 76*e*, and the hypervisor grants access, as indicated as 76*f*. For initialization only, the client SVM may instruct the appliance SVM to authenticate all new users with the client's private key, as indicated as 76*g*. In the embodiment wherein persistent storage of client data is used, the appliance SVM may store the client's private key in the persistent storage, as indicated at 76*h* (FIG. 3B).

This implementation has the client starting first is so that it can transmit the information about the shared area to the appliance. Whatever entity creates the shared area has to pass the related information to the second party. The virtual machine that creates the shared area determines how many other virtual machines have access to it. Since a primary concern is the appliance not leaking customer data, this design has the customer (client SVM) control creation of the shared area. If a customer were not concerned about data leakage from an appliance, an alternative implementation would have the shared area created by the application SVM.

The mutual authentication that occurs via the shared memory when the appliance is started notifies the client that the appliance has started. Alternatively, the secure appliance can use its side of the API to inform the client that it has started. A secure appliance is willing to talk to anyone who launches it, or more accurately, anyone who has access to the shared memory area that was identified when it was launched. The secure appliance's API could be written to enable conversation with multiple partners through a single shared area. The most secure way for a client SVM to use such an appliance is for the client SVM to specify the shared area to the appliance SVM and indicate that only one party is to have access to the shared area, and tell the ultravisor not to grant access if the receiving party is not an appliance. That way the client is the only user of the interface, but if there should be more users because the client SVM specifies the shared area it controls who is using the interface. Alternatively, an appliance could also have multiple shared areas.

The functions of the API are restricted by the secure appliance and need to be tailored by the appliance creator who must ensure that no appliance code or information is leaked through its API. Our preferred embodiment is that the appliance has one shared area and that the client specifies the shared area to the appliance.

Those skilled in the art will appreciate that the only entity that needs to be trusted in cloud computing node 60 (with regard to inadvertent or nefarious disclosure of customer data and/or appliance code) is the ultravisor.

An appliance can be suspended by the hypervisor, in which case all of its current state will be available to the hypervisor in encrypted form protected by a key known only to the ultravisor or as an alternative to the ultravisor and the creator of the appliance. The metadata needed to restart the appliance will be made available to the hypervisor with integrity protection. The hypervisor can write all the state out to persistent storage. When the hypervisor, or someone else who is directing the hypervisor decides to resume the appliance, a command will be given to the hypervisor which will cause the hypervisor to bring the state back into memory (the hypervisor could independently decide to suspend an SVM or it could be done in response to an explicit command by an operator; similarly, the resume could be automatic or explicit). The hypervisor will transfer control to the location indicated in the metadata associated with hibernation. When the appliance resumes the state will be decrypted and integrity checked by the ultravisor prior to allowing the execution to proceed. The ultravisor will prevent execution of the appliance if it detects any tampering with the state or metadata.

Figure 4A:
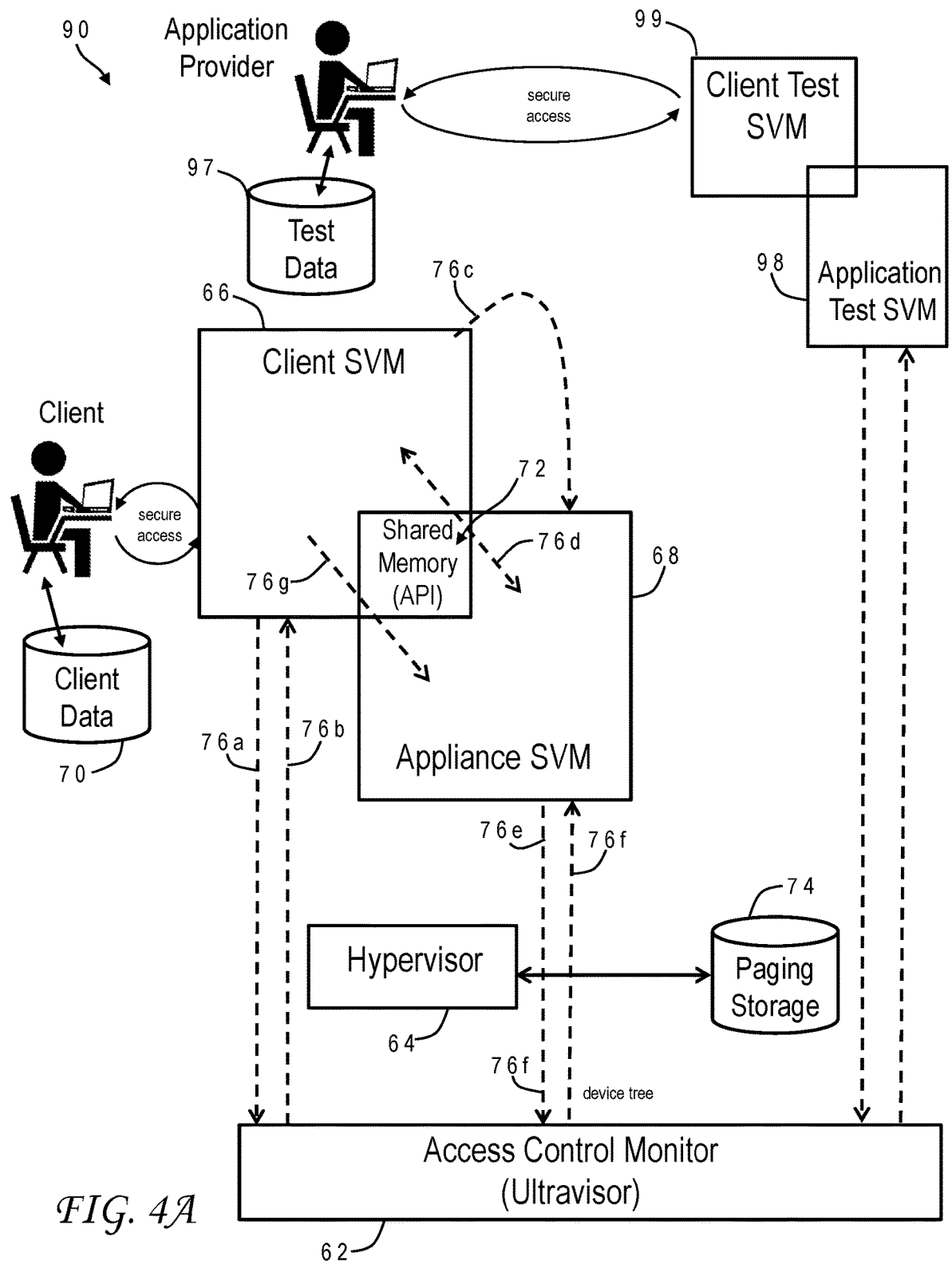
FIG. 4A is a block diagram of another computing environment in accordance with one implementation of the present invention having four separate logical partitions (secure virtual machines)

FIG. 4A shows an alternative use of the invention in which four separate SVMs are used. All of the SVMs are assumed to be running on a single node in a cloud computing system 90. This node has ultravisor 62, hypervisor 64, client SVM 66, appliance SVM 68, an application test SVM 98, and a client test SVM 99. It is expected that the appliance creator (application provider) can configure the appliance in such a way as it will operate correctly on a wide range of hardware configurations. There may be a situation in which the user of an appliance in unable to get it to work in their specific hardware environment, or encounter idiosyncrasies or bugs unique to their environment. In this situation it is necessary for the creator of the appliance 68 to be able to test the appliance with test data 97 supplied by the appliance user in the environment where the appliance will operate. FIG. 4A illustrates this environment. The application provider gets a test SVM 98 in the environment of the client and accesses it through a test client 99. The application provider has inserted debug code into the test SVM 98 that enables it to examine the necessary components to determine the issues. The test SVM 98 is not an appliance, consequently not all of the interfaces have been removed by the ultravisor. The application provider drives the application through a test client SVM 99 with test data 97 provided by the client of the appliance. Once the issues have been identified and corrected, the application provider can regenerate an appliance SVM 68 and redistribute to the client. Alternatively, if the appliance has persistent storage, a configuration API, and the changes are configuration data that is normally recorded on persistent storage, the application provider may be able to activate the appliance, and use its configuration APIs to write the necessary data to persistent storage. If the application provider expects that this might be a normal sequence, then after testing the appliance the provider might disable the configuration API preventing any further change to the configuration information. For an appliance without persistent storage as illustrated in FIG. 4A, the application provider should regenerate a copy of the appliance SVM.

The hardware and ultravisor again have mechanisms that allow only authorized users access to specific constructs in the systems (e.g., SVMs or containers). No one other than the client has access to appliance SVM 68. An API is provided between client SVM 66 and appliance SVM 68. Via this interface the client issues commands, supplies data to be processed by the application, and receive results from the appliance. The client loads their data 70 to be processed through the client SVM 66 feeding it to the appliance SVM 68.

Appliance SVM 68 is used for processing the data by the application. Neither the client nor the application provider team (nor the system administrator for that matter) can directly access application test SVM 98. In order to run the application as an appliance, the team deploys (or creates) an instance of their application test SVM 98 to appliance SVM 68. All access to the appliance from external devices is revoked when activated which then allows a client to interface with and use the application running in the appliance via the API. Since the client provides only data and no executable code in this embodiment, it is not possible for a client (possibly nefarious) to inadvertently or deliberately copy and transmit executable code from the appliance. This ensures the intellectual property embodied in the code is protected from access and theft.

Figure 4B:
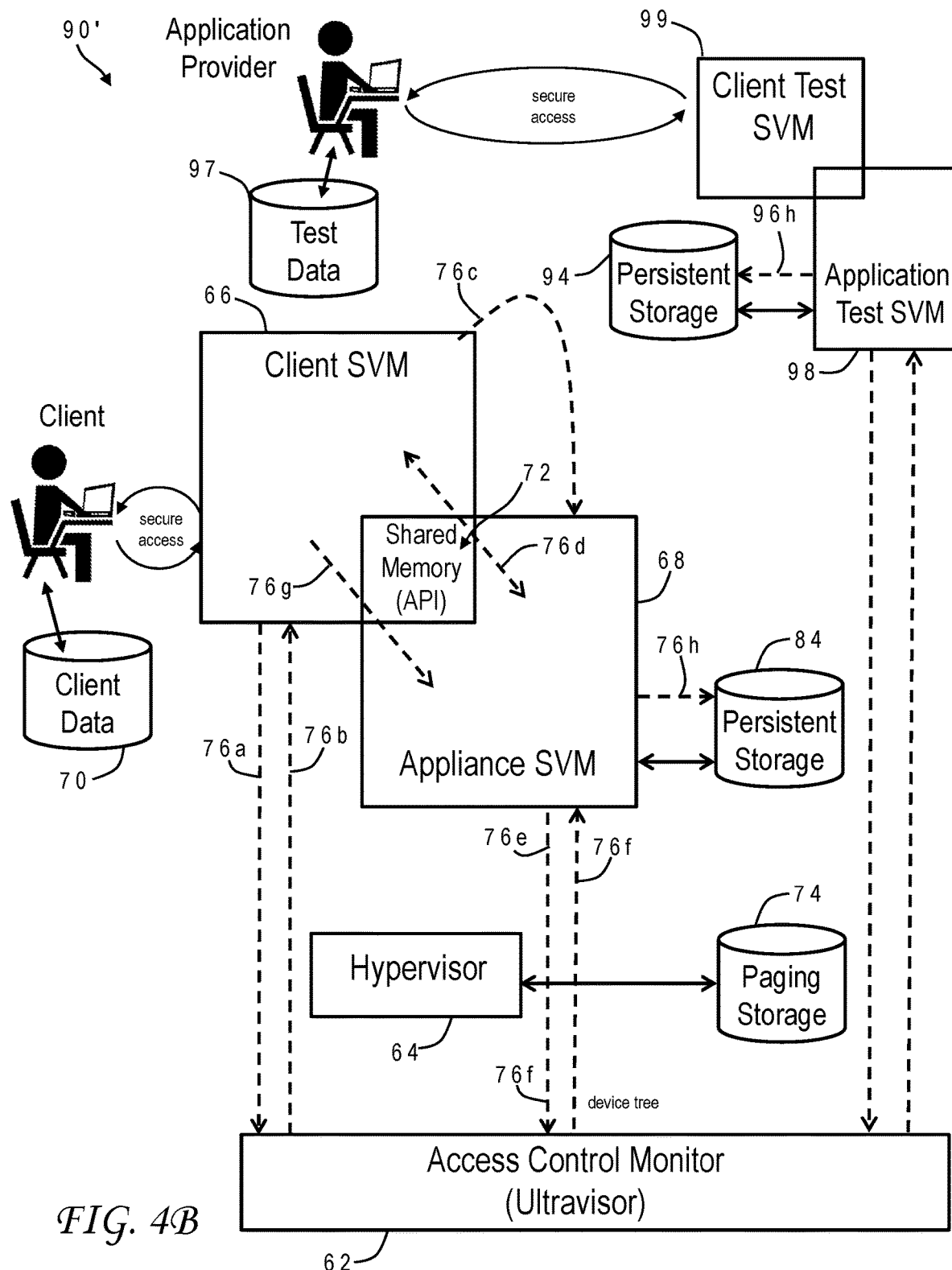
FIG. 4B is a block diagram similar to FIG. 4A for another implementation of the present invention wherein the appliance and the third secure virtual machine both save data to an encrypted persistent storage device.

FIG. 4B is nearly identical to FIG. 4A except for the inclusion of additional persistent storage 84 and 94, for use in those cases where there is a need to securely store client data (e.g., application data) in a persistent form. Appliance SVM 68 uses persistent storage 84 while client SVM 99 talks to the application test SVM 98 which uses persistent storage 94. In this case since the appliance SVM 68 has persistent storage, it may be possible for the application provider using interfaces that already exist in the appliance SVM to modify the persistently stored configuration information to resolve the issues.

Figure 5:
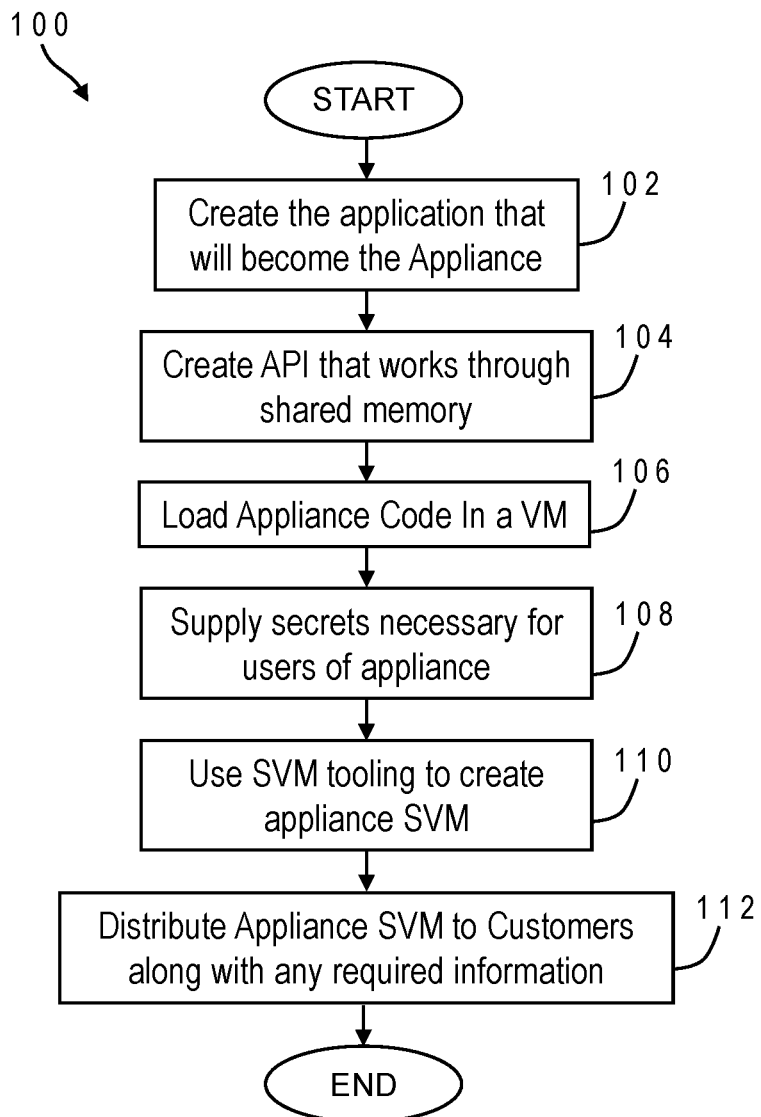
FIG. 5 is a chart illustrating one procedure for creating an appliance SVM in accordance with one implementation of the present invention.

The present invention may be further understood with reference to the chart of FIG. 5 which illustrates the process 100 of creating an appliance SVM. First the application that is to become an appliance is created (102). This could be a new application or an existing application that the creator desires to make into an appliance. Next the API has to be created that will work through shared memory (104). For new applications, this is part of writing the application. For an existing application, this means modifying the existing API so that shared memory can be used as a transport. Those skilled in the art understand how to do this, it is a common approach to developing interfaces for applications. The appliance code is loaded into a virtual machine along with the appliance API (106). Included in this VM, or configured into the VM, are the secrets necessary for users of the appliance SVM (108). As discussed above, for some implementations a client SVM must be able to securely distribute the token to the appliance SVM. Any technique known to the art may be used. One such technique is for the appliance SVM to have a public-private (asymmetric) key pair. The creator of the appliance SVM must include the private key in the appliance and assure that no other party know it. Once the appliance SVM is created no one can extract the private key. The public key can be distributed to users of the appliance. The client SVMs that activate the appliance can encrypt the token under the public key of the appliance. They can then use facilities of the hypervisor without risking theft of the token. Other secrets, such as how to authenticate a valid user, can also be included. SVM tooling, not described in this application, is used to create the appliance SVM from the appliance VM (110). This results in a binary object that is the appliance SVM. This object can be distributed to users of the appliance (112). Describing these discrete steps is not meant to preclude the full or partial automation of this process using techniques known to the art.

Figure 6A:
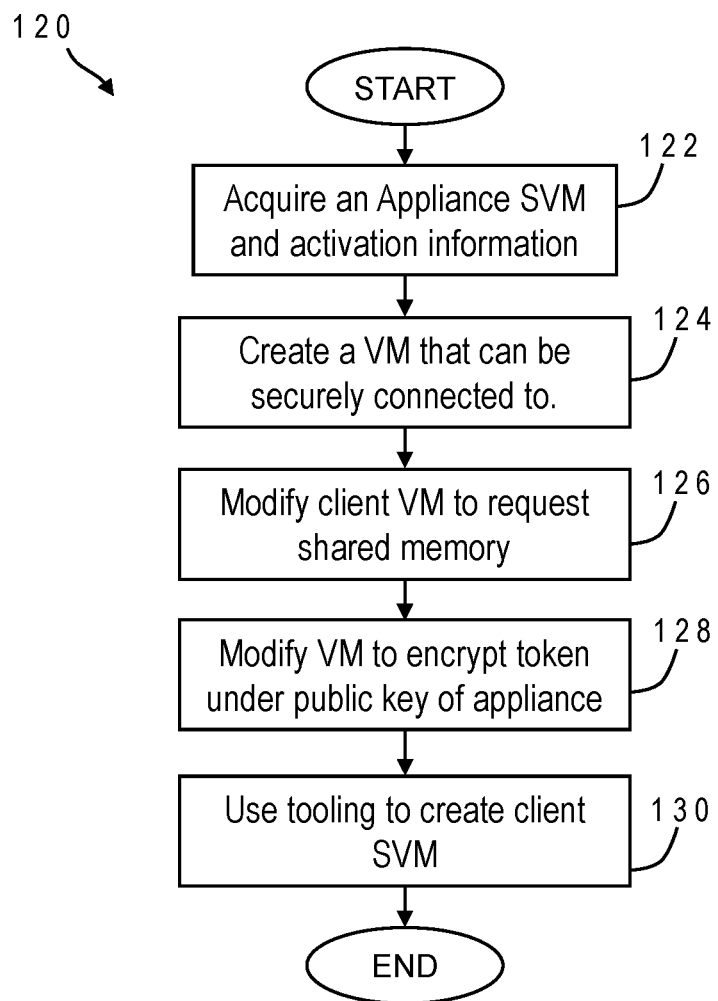
FIG. 6A is a chart illustrating one procedure for creating a client SVM in accordance with one implementation of the present invention.

FIG. 6A indicates a process 120 for how a client would make use of an appliance SVM. The client acquires an appliance SVM and the activation information, public or symmetric keys as necessary (122). They create a VM that enables a secure connection (124). This VM will be made into the client SVM using this procedure. They modify this client VM to request shared memory, preferably with one other user, but with as many additional users as required by the client (126). They modify the client VM to securely pass the token to the appliance SVM (128). One such technique is to encrypt the token under the public key of the appliance SVM. Any technique known to the art that is supported by the appliance SVM can be used. This step 128 includes adding commands as necessary such as being able to direct the client to start and/or end the appliance SVM. Next the SVM tooling, not described in this disclosure, is used to convert the VM into an SVM (130). The user acquires an appliance SVM and any information needed to activate and authenticate. There can be an arbitrary amount of time between creating the client SVM and utilizing it.

Figure 6B:
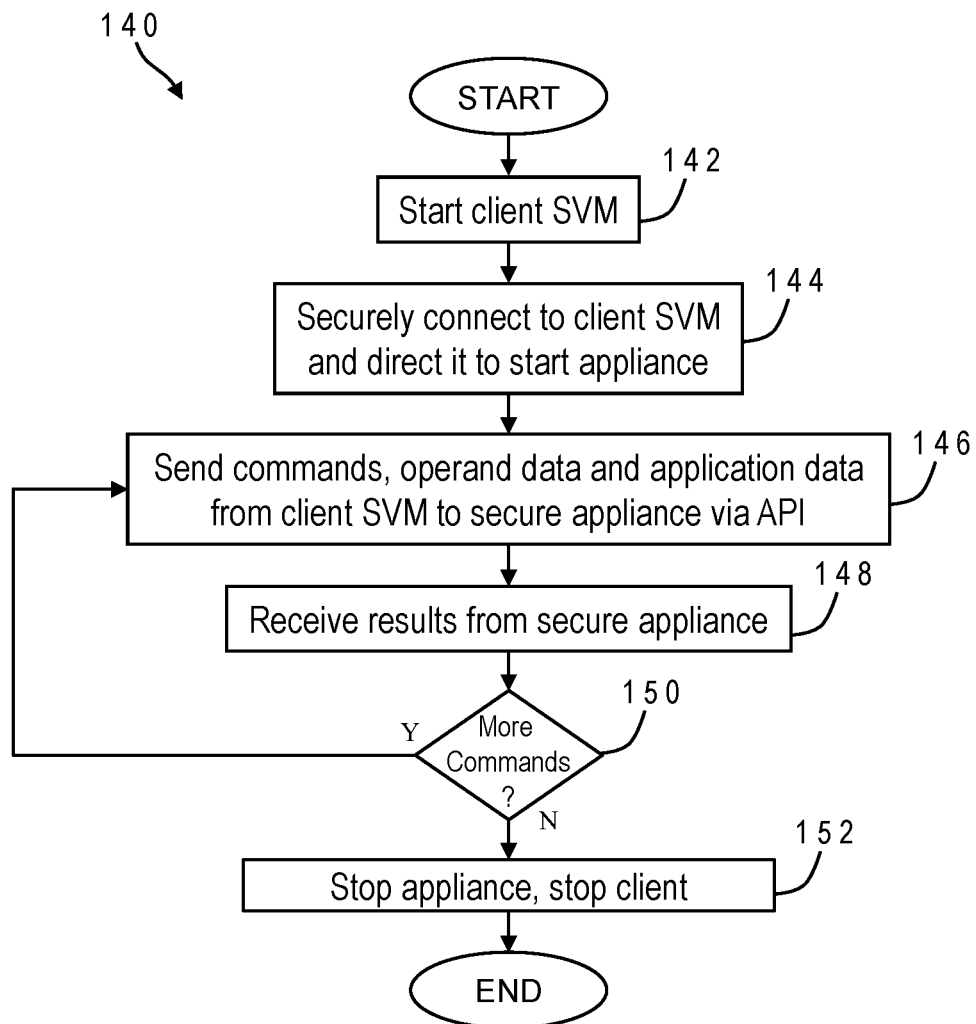
FIG. 6B is a chart illustrating one procedure for operation of the client SVM in accordance with one implementation of the present invention.

The flow could continue from FIG. 6A to FIG. 6B but the customer/client does not have to create a client SVM for the appliance if it already exists, so the continued operation of the client SVM is shown separately. The user starts the client SVM (142), and securely connects to it and directs it to start the appliance (144). When the appliance SVM is started the ultravisor removes all interfaces from the SVM. After it starts, the appliance SVM will unwrap the secret and request the shared memory area. It will communicate through the shared area to the client SVM that requested it to start. It may optionally use other secrets that it has received to affirm that it is communicating with an authorized client. For as long as the client wants to use the appliance SVM, they send commands, operand data and application data (146) to the appliance and receive results (148) from the appliance via the API which works through shared memory. Once they are done, as represented by the fact that there are no more commands to enter (150), they direct the client SVM to stop the appliance and then to terminate itself (152). If an appliance SVM has persistent storage, it may securely record results from each activation for use in later activations. If an appliance SVM does not have persistent storage, all results from its use will disappear, be erased, or be destroyed when the appliance SVM is terminated in step 152. These discrete steps have been described, but any techniques known to the art can be utilized to automate this process, effectively reducing the number of steps. Further, automated processes could be used to combine actions illustrated in FIG. 5 and FIGS. 6A and 6B in varying ways to achieve a similar result.

Figure 7:
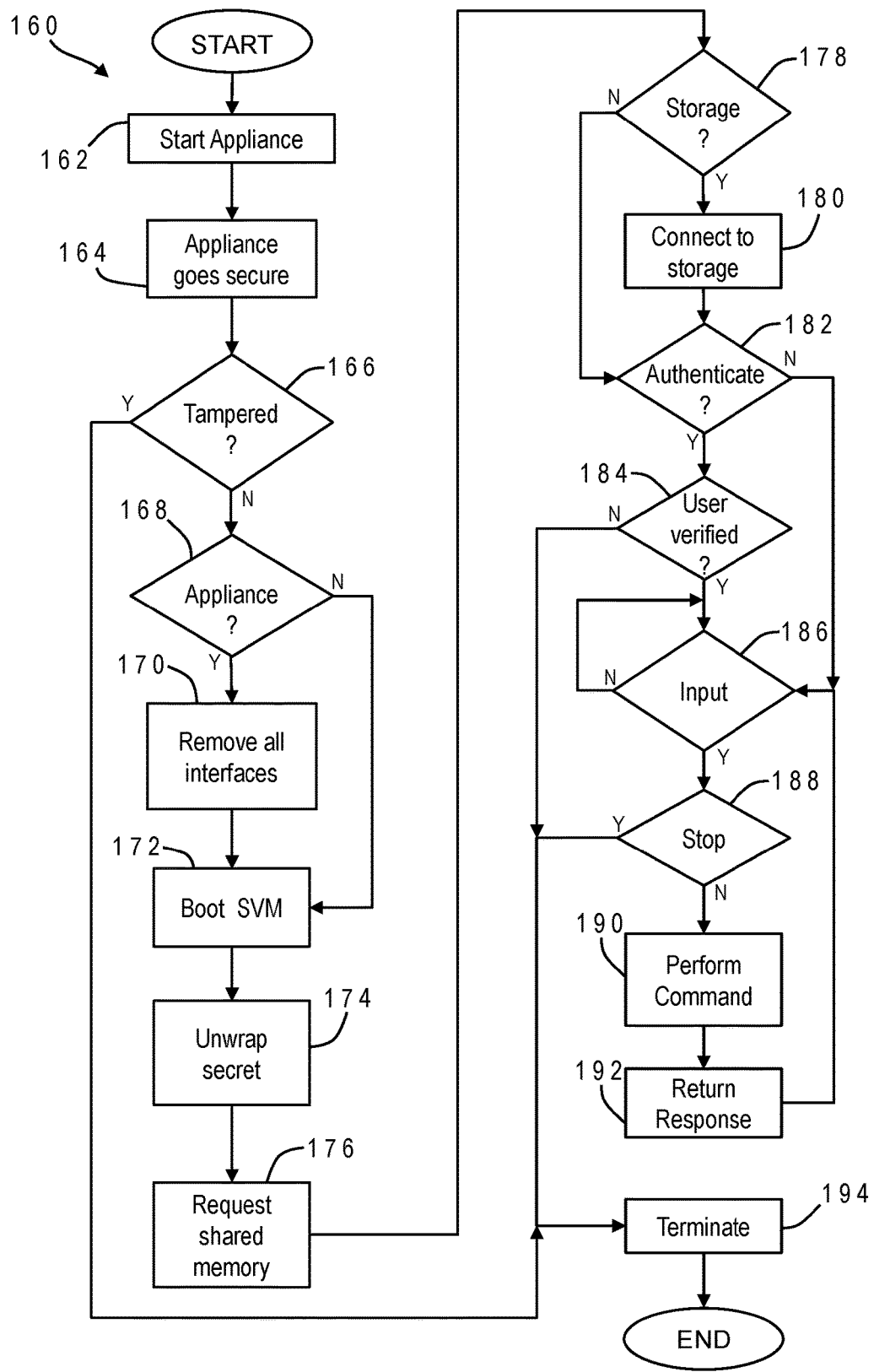
FIG. 7 is a chart illustrating the interactions that occur during activation and use of an appliance SVM in accordance with one implementation of the present invention.

One procedure 160 for activation and use of the appliance SVM is depicted in the flow chart of FIG. 7. As previously mentioned the client SVM has used interfaces known in the art to request the starting of the appliance SVM, including securely passing the token to the appliance. The appliance SVM is started by the hypervisor (162). The code in the appliance requests to enter a secure mode (164). This request goes to the ultravisor which checks to see if the SVM has been tampered with (166). If it has been tampered with, then the execution terminates (194). Next the ultravisor checks to see if this is an appliance SVM (168). If it is an appliance, the ultravisor records that fact and removes all interfaces from the SVM (170). It then proceeds to boot the SVM (172). If it is not an appliance it will be booted without the removal of interfaces (172). The booting process for the appliance loads all the appliance code into the SVM. This code does its initial initialization and eventually unwraps the token (or secret) for the shared memory (174). It requests access to the shared memory from the ultravisor (176). Since this is an appliance, the ultravisor returns to the appliance with the shared memory mapped. As has been previously noted the client has the ability to ask the ultravisor to not grant access to shared memory if the requesting SVM is not an appliance. Next the appliance checks to see if it has any storage (178). This check will only be true if it has been configured with persistent storage. If it has persistent storage, it connects to the persistent storage (180). Whether or not there is persistent storage, it checks to see if client authentication is required (182). If client authentication is required it is carried out (184). If the user does not properly authenticate, the SVM terminates (194). If client authentication succeeds or is not required the appliance waits for input from the user until a command is received (186). If it is a stop command the appliance terminates (194) and execution stops. Otherwise it performs the particular command (190), returns the response (192), and waits for another command (186).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. This invention was crafted to protect innovative and proprietary executables with the Watson™ system in mind, but it is readily usable by other application providers as well. Not needing to trust the application nor the supplier of the application code while also preventing access to the application executables may be a first for the industry and is extremely useful especially since it is accomplished without requiring human surveillance or intervention. It is therefore contemplated that such modifications can be made without departing from the spirit or scope of the present invention as defined in the appended claims.

What is claimed is:

1. A method of protecting client data from unauthorized disclosure comprising:
   loading appliance code in an appliance which includes a secure virtual machine that uses a set of computing resources;
   revoking all access to devices from within the appliance except for a shared memory and an encrypted persistent storage device external to the appliance wherein the appliance code includes an application program interface that uses the shared memory and wherein all access to a logical partition of the appliance is revoked when the partition is activated;
   receiving commands, operand data and application data at the appliance via the shared memory;
   recording the application data in the encrypted persistent storage device;
   processing the commands, operand data and application data by the appliance code in the appliance to yield results; and
   communicating the results of said processing to a client of the appliance via the shared memory.

2. The method of claim 1 wherein the appliance is a first secure virtual machine, the set of computing resources is a first set of computing resources, and further comprising creating the client which includes a second secure virtual machine that uses a second set of the computing resources, wherein the appliance and client operate in a system environment having a security mode imposed by an ultravisor embodied in microcode, and the client uses the ultravisor to allocate the shared memory and causes the appliance to be started with a token used to access the shared memory.

3. The method of claim 2 wherein the ultravisor maintains exclusive access control over the computing resources and limits access to both the appliance and the client.

4. The method of claim 3 wherein:
   the ultravisor receives a request from the client to provide the shared memory and responsively creates the token; and
   the appliance receives an encrypted version of the token from the client, decrypts the encrypted version using a public key, and requests access to the shared memory from the ultravisor using the token.

5. The method of claim 3 wherein the ultravisor prevents the appliance from communicating with any devices by controlling a device tree used by an operating system of the appliance.

6. The method of claim 1 further comprising:
   saving all data from a memory of the partition in a second encrypted persistent storage device;
   deleting the data from the memory; and
   deactivating the partition.

7. The method of claim 1 wherein the appliance is deployed to the partition from a different logical partition.

8. The method of claim 2 wherein the ultravisor prevents any entity other than the client from accessing the appliance while also preventing the client from accessing the appliance code.

9. A secure computing system comprising:
   an appliance including a secure virtual machine constructed from a set of computing resources;
   appliance code residing in the appliance;
   an encrypted persistent storage device external to the secure virtual machine; and
   revoking all access to devices from within the appliance except for a shared memory and the encrypted persistent storage device wherein the appliance code includes an application program interface that uses the shared memory and wherein all access to a logical partition of the appliance is revoked when the partition is activated;
   wherein the appliance processes commands, operand data and application data received via the shared memory using the appliance code to yield results, records the application data in the encrypted persistent storage device, and communicates the results to a client of the appliance via the shared memory.

10. The secure computing system of claim 9 wherein the secure virtual machine is a first secure virtual machine, the set of computing resources is a first set of computing resources, and further comprising a second secure virtual machine constructed from a second set of the computing resources wherein the shared memory is shared with the second secure virtual machine and the second secure virtual machine provides the commands, operand data and application data.

11. The secure computing system of claim 10 further comprising an ultravisor which creates the first and second secure virtual machines, maintains exclusive access control over the computing resources, and revokes the access to the first secure virtual machine.

12. The secure computing system of claim 11 wherein the secure virtual machine is a first secure virtual machine, the set of computing resources is a first set of computing resources, and further comprising a client which includes a second secure virtual machine that uses a second set of the computing resources wherein the appliance and client operate in a system environment having a security mode imposed by an ultravisor embodied in microcode, and the client uses the ultravisor to allocate the shared memory and causes the appliance to be started with a token used to access the shared memory.

13. The secure computing system of claim 11 wherein the ultravisor maintains exclusive access control over the computing resources and limits access to both the appliance and the client.

14. The secure computing system of claim 13 wherein:
the ultravisor receives a request from the client to provide the shared memory and responsively creates the token; and
the appliance receives an encrypted version of the token from the client, decrypts the encrypted version using a public key, and requests access to the shared memory from the ultravisor using the token.

15. The secure computing system of claim 13 wherein the ultravisor prevents the appliance from communicating with any devices by controlling a device tree used by an operating system of the appliance.

16. The secure computing system of claim 9 wherein the ultravisor saves all data from a memory of the partition in encrypted persistent storage, deletes the data from the memory, and deactivates the partition.

17. The secure computing system of claim 9 wherein the appliance is deployed to the partition from a different logical partition.

18. The secure computing system of claim 12 wherein the ultravisor prevents any entity other than the client from accessing the appliance while also preventing the client from accessing the appliance code.

19. A computer program product comprising:
a non-transitory computer readable storage medium; and
program instructions residing in said storage medium for protecting client data from unauthorized disclosure by loading appliance code in an appliance which includes a secure virtual machine that uses a set of computing resources, revoking all access to devices from within the appliance except for a shared memory and an encrypted persistent storage device external to the appliance wherein the appliance code includes an application program interface that uses the shared memory and wherein all access to a logical partition of the appliance is revoked when the partition is activated, receiving commands, operand data and application data at the appliance via the shared memory, processing the commands, operand data and application data by the appliance code in the appliance to yield results, recording the application data in the encrypted persistent storage device, and communicating the results to a client of the appliance via the shared memory.

* * * * *